United States Patent

Kodama et al.

[11] Patent Number: 5,132,257
[45] Date of Patent: Jul. 21, 1992

[54] COMPOSITE CERAMIC SINTERED BODY AND PROCESS FOR PRODUCTION THEREOF

[75] Inventors: Hironori Kodama, Hitachi; Takaaki Suzuki, Mito; Kie Nakamura, Sapporo; Kunihiro Maeda, Hitachi, all of Japan

[73] Assignee: Hitachi, Ltd., Tokyo, Japan

[21] Appl. No.: 603,439

[22] Filed: Oct. 26, 1990

Related U.S. Application Data

[63] Continuation of Ser. No. 168,438, Mar. 15, 1988, abandoned.

[30] Foreign Application Priority Data

Mar. 16, 1987 [JP] Japan ................................. 62-58849
Apr. 8, 1987 [JP] Japan ................................. 62-84777

[51] Int. Cl.$^5$ ........................ C04B 35/80; C04B 35/58
[52] U.S. Cl. .................................... 501/95; 501/92; 501/97; 501/32; 501/126; 501/103
[58] Field of Search ............................. 501/95, 92, 97

[56] References Cited

U.S. PATENT DOCUMENTS 4,745,091 5/1988 Landingham .................... 501/95
5,026,671 7/1991 Hanzawa et al. .................... 501/88

FOREIGN PATENT DOCUMENTS

103651 3/1981 Japan ................................. 501/97
200863 10/1985 Japan ................................. 501/97

Primary Examiner—William R. Dixon, Jr.
Assistant Examiner—C. Bonner
Attorney, Agent, or Firm—Antonelli, Terry, Stout & Kraus

[57] ABSTRACT

A composite ceramic sintered body is made from a ceramic matrix comprised mainly of silicon nitride, silicon oxynitride or an inorganic oxide selected from alumina, mullite, zirconia, high silica glass, lithium-aluminosilicate glass, magnesium-aluminosilicate glass or barium-magnesium-aluminosilicate glass, containing both whiskers and particles of a material selected from silicon carbide, silicon nitride, silicon oxynitride, alumina and zirconia dispersed therein. The whiskers have a diameter of 0.1 to 5 μm and the particles have an average particle size of 5 to 60 μm. The composite ceramic sintered body is homogeneous and isotropic, and it has a high strength and high toughness at a high temperature and an excellent heat resistance and oxidation resistance.

13 Claims, 7 Drawing Sheets

COMPOSITE CERAMIC SINTERED BODY AND PROCESS FOR PRODUCTION THEREOF

This is a continuation of application Ser. No. 168,438 filed Mar. 15, 1988, abandoned.

BACKGROUND OF THE INVENTION

1. Field of the Invention

This invention relates to a composite ceramic sintered body which has a high strength and high toughness at a high temperature and an excellent heat resistance, oxidation resistance, wear resistance and erosion resistance, and which is homogeneous and isotropic, and further to a process for the production of the body. This composite ceramic sintered body is suitable for use as high temperature structural elements, precise structural elements, cutting tools and the like.

2. Description of the Related Art

Since ceramics have excellent properties such as heat resistance, oxidation resistance, high strength, wear resistance and high rigidity, they have hitherto been researched and developed for use thereof as high temperature structural elements or wear resistant elements. However, in order to put these ceramics in practical use as various elements, higher toughness and strength have been required. Particularly, in recent years, improvement not only in reliability but also toughness of the ceramics has been greatly required.

That is, in recent years, many studies have been made on the utilization of the ceramic sintered bodies as materials for high temperature structural elements such as blades of gas turbines, hot plugs of diesel engines, housings of internal combustion engines, hot forging dies, rotators of turbochargers; and cutting tools, various nozzles, pipes, rockerarm tips, dies and etc. However, there have never been obtained reliable ceramic sintered bodies.

In order to improve the toughness of ceramics, they should have a great energy for fracture. There have been many proposals of giving them such a great fracture energy. According to the proposals, ceramics such as carbides, nitrides and oxides are used as matrices and fibers or whiskers are incorporated into the matrices to form composites. (See G. C. WEI and P. F. BECHER, "Improvements in Mechanical Properties in SiC by Addition of TiC Particles", Journal of the American Ceramic Society, Vol. 67, No. 8, 1984, pp. 571-574; and C. C. SORRELL, V. S. STUBICAN and R. C. BRADT, "Mechanical Properties of ZrC—ZrB$_2$ and ZrC—TiB$_2$ Directionally Solidified Eutectics", Journal of the American Ceramic Society, 69 [4], 1986, pp. 317-321.) The fracture energy of the composite ceramics containing fibers or whiskers therein is greater than that of noncomposite ceramics free of such fibers or whiskers, because the fibers or whiskers allow the course of cracks to turn, or prevent the propagation of the cracks. Furthermore, in such ceramics containing fibrous materials such as fibers or whiskers incorporated therein a mechanism whereby energy is absorbed by allowing the fibers or whiskers to be pulled out from the matrices is considered to be working, in addition to the above-mentioned mechanism. Thus, the greater fracture energy or toughness can be given to ceramics by making various mechanisms in ceramics.

However, when high temperature structural elements or precise structural elements are to be made from the composite ceramics, the composite ceramics are not only required to have a high strength and high toughness but also to have an excellent heat resistance, oxidation resistance and homogeneity. In this respect, ceramics developed until now have still been unsatisfactory and contained many problems.

For example, toughened ceramics of ZrO$_2$ obtained by utilizing the phase transition loses the toughness when it is heated to a high temperature of, for example 1,000° C. or higher.

In most processes for improving toughness by incorporating a metal or its compounds such as carbides, nitrides, borides or silicides as an additive for giving a composite, the composite is inferior in oxidation resistance to a matrix material alone.

Therefore, the matrix material and the additive both should be individually at least excellent in heat resistance and oxidation resistance, and further combinations of the matrix materials and the additives should be selected to achieve higher toughness. However, for example, many materials having an excellent heat resistance and oxidation resistance have physical properties close to each other. Therefore, it is not so effective to give the toughness to ceramics by accumulating internal strains in the ceramics. Thus, the toughness cannot abruptly be improved.

To the contrary, in a fiber-reinforcing process, the fiber shape and strength of a material to be added to a composite have a great effect on the toughness of the composite. Particularly, studies on composite ceramics reinforced with fibers or whiskers and having the heat resistance and oxidation resistance required in recent years are noticed. (See, for example, S. T. BULJAN and V. K. SARIN, "Silicon Nitride-Based Composites", COMPOSITES, Vol. 18, No. 2, April 1987, pp. 99-106; D. K. SHETTY, M. R. PASUCC and others, "SiC Monofilament-Reinforced Si$_3$N$_4$ Matrix Composites", Ceramic Engineering Science Proceedings, published by the American Ceramic Society, 1985; and T. YAMAMOTO, "Ceramics/Fibers Composites", ELECTRONIC CERAMICS, July 1986, pp. 52-56; and S. T. BULJAN, J. GARY BALDONI and others, American Ceramic Society Bulletin, 66 [2], 1987, pp. 347-352.)

On the other hand, there was reported and example of a one-direction fiber-reinforced composite comprising a glassy matrix reinforced with long carbon fibers or long SiC fibers synthesized from organic silicon compounds. However, these fibers used in the composite are thick and hence the composite is not homogeneous in its properties Furthermore, the composite is tough only in one direction and hence anisotropic. The fibers themselves are poor in heat resistance and oxidation resistance This composite requires to orient the fibers and hence a process for production of the composite is complex Thus, this example has some problems as mentioned above.

There were also reported some examples that whiskers were tried to be used as reinforcing fibers to eliminate the anisotropy and unhomogeneity. (See, for example, Japanese Patent Kokai No. 60-200863; American Ceramic Society Bulletin, 64 [2], 298-304, 1985; or American Ceramic Society Bulletin, 65 [2], 351-56, 1986.)

Japanese Patent Kokai No. 60-200863 discloses a silicon nitride-base ceramics comprising, on the weight basis, 1-30 wt % of at least one in a whisker form selected from the group consisting of SiC, Si$_3$N$_4$, B$_4$C and TiB$_2$; 1-30 wt % of at least one of carbides and nitrides of Groups IVa and Va elements of the Periodic Table; and 1-10 wt % of $Y_2O_3$, the balance being silicon nitride.

In American Ceramic Society Bulletin, 64 [2], 298-304, G. C. WEI, P. F. BECHER and others showed a highly tough silicon carbide whiskers-reinforced alumina ceramic composite as a combination having an excellent heat resistance and oxidation resistance, in which the whiskers were added in an amount of 10 to 30 vol %. However, in all the examples the toughness ($K_{IC}$) has been only improved to be at most 8 to 9 $MPam^{\frac{1}{2}}$. This is because the diameter of whiskers used is small, which is less effective in preventing the propagation of cracks. If the amount of such whiskers added is too great, then the resultant sintered composite is hard to be densified and, therefore, the added amount is limitative.

In American Ceramic Society Bulletin, 65 [2], 351-56, 1986, P. D. Shallek and J. J. Petrovic showed that the addition of silicon carbide whiskers in an amount of 10 to 30 vol % produced a composite sintered body having a fractural toughness ($K_{IC}$) of 10 to 10.5 $MPam^{\frac{1}{2}}$. However, the diameter of the whiskers used in this example was 3 to 10 $\mu m$, which is much thicker than that of commercially available whiskers, i.e., 0.1 to 5 $\mu m$. Such thick whiskers are hardly commercially available. In examples previously reported, on the other hand, whisker-reinforced silicon nitride composite sintered bodies have a fractural toughness ($K_{IC}$) of at most 7 to 8 $MPam^{\frac{1}{2}}$. Reasons therefor are that particularly in a silicon carbide-reinforced composite sintered body using silicon nitride as a matrix the strength of the silicon carbide is lowered since the sintering temperature of the silicon nitride matrix is high, that the smaller diameter of the whiskers added reduces such effects as mentioned above in preventing the propagation of cracks, and that the amount of the whiskers added is limitative since greater amount of the whiskers added makes it hard to densify the sintered body.

Thus, such prior art techniques as mentioned above have not yet obtained satisfactorily homogeneous, isotropic, heat resistant, oxidation resistant and tough composite sintered ceramic bodies which are suitable for structural elements and etc.

SUMMARY OF THE INVENTION

The main object of this invention is to provide a novel tough composite ceramic sintered body suitable for use as high temperature structural elements, precise structural elements, cutting tools and etc. having such various problems as mentioned above eliminated therefrom.

Another object of this invention is to provide a process for producing the novel composite ceramic sintered body.

This main object can be achieved by selecting a proper combination of a ceramic matrix with both whiskers and particles of a material having a melting point higher than the sintering temperature of the ceramic matrix, thereby making the toughness-giving synergistic effects of both the particles and the whiskers.

DETAILED DESCRIPTIONS OF PREFERRED EMBODIMENTS

The inventors have found that the addition to a ceramic matrix and the dispersion of both whiskers and particles of a material having a higher sintering temperature than the melting point of the ceramic matrix can greatly improve the bending strength and fractural toughness of the resultant sintered body with the synergistic effects of the whiskers and the particles.

In accordance with this invention, silicon nitride, silicon oxynitride or inorganic oxides are used as a matrix.

The inorganic oxides used in this invention include usual crystalline substances, glasses and crystallized glasses (glass ceramics). When high heat resistant or oxidation resistant composites are particularly required, oxide ceramics such as alumina, mullite or zirconia is used as a matrix.

The glasses preferably include high silica content glass, and the crystallized glasses include lithium.aluminosilicate glass (LAS), magnesium.aluminosilicate glass (MAS), barium.magnesium.aluminosilicate glass (BMAS) and the like.

Raw materials for the matrix may be in the conventional range of average particle size and preferably have an average particle size of 10 $\mu m$ or less.

As materials for whiskers and particles there may be used silicon carbide, silicon nitride, oxynitrides such as SiAlON, alumina and zirconia.

The amount of the whiskers added is preferably in the range of 1 to 50 wt %, more preferably 1 to 40 wt %. If the amount exceeds 50 wt %, the dispersion of the whiskers is difficult, a dense sintered body cannot be obtained, and the strength and toughness are lowered.

The average particle size of the particles added is preferably in the range of 5 to 60 $\mu m$. If the size is smaller than 5 $\mu m$, the propagation of cracks is hardly inhibited and the toughness is insufficiently improved. If the size is greater than 60 $\mu m$, the particles themselves undesirably cause the remarkable reduction of strength. Particularly, the average particle size is most suitably in the range of 5 to 50 $\mu m$ to obtain a sintered body having a high strength and high fractural toughness.

The amount of the particles added is preferably in the range of 1 to 30 wt %. If the amount exceeds 30 wt %, the toughness is remarkably lowered. The strength is reduced as the amount of the particles is increased. Therefore, the amount is particularly suitably in the range of 5 to 20 wt % to obtain the high toughness and high strength.

When the amounts of the whiskers and particles are particularly great, a composite using a glass or crystallized glass as a matrix can easily be made denser.

Furthermore, a whisker/particle weight ratio is preferably in the range of 0.5 to 20, more preferably 1 to 5 to obtain the high strength and high fractural toughness.

The raw materials for the whiskers and particles have preferably more excellent heat resistance than that of the material selected as matrix. Particularly when the high heat resistance and high oxidation resistance are required, these raw materials are preferably selected from alumina, mullite, zirconia, SiC, $Si_3N_4$, SiAlON and the like. The whiskers and particles added may be made of the same or different materials, combinations of which can most suitably be selected by taking account of the properties of them. Furthermore, the raw materials for the whiskers and particles may be used singly or in combination.

The composite sintered ceramic body of this invention can be produced by, for example, intimately mixing a matrix powder, whiskers and particles in a predetermined proportion, shaping the resultant mixture and sintering the mixture.

In accordance with the mixing procedures of this invention, SiC whiskers are dispersed into a solvent with ultrasonic wave, admixed to a mixture of SiC particles and matrix powder previously prepared and dried to form a powdery composition, to which may be optionally added a shaping binder such as PVA or low-density polyethylene, depending upon types of shaping ways. The shaping ways are usually pressing or extrusion.

Ways for sintering may include various ways such as pressureless sintering conducted under atmospheric pressure or lower; hot press sintering conducted while uniaxially pressing a powder in a graphite mold; hot isostatic pressing (HIP) conducted in the presence of an inert gas at a pressure of 1,000 to 2,000 atm; reaction sintering; and gas pressure sintering. Particularly, the hot press sintering, gas pressure sintering and HIP sintering are effective to obtain a highly strong and highly tough material. The sintering temperatures in the hot press and the HIP are preferably in the ranges of 1650° to 1850° C. and 1800° to 2000° C., respectively. The relative densities of sintered bodies obtained by these sintering methods are 99% or more. The relative densities of bodies having complicated shapes when sintered with the pressureless sintering or reaction sintering are about 95%, and the subsequent HIP sintering can raise up the relative density to about 99%, thus producing a high-temperature high strength and high toughness sintered body having a complicated shape.

When glass or crystallized glass is used as a matrix, the shape of the additives may be impregnated with the glass.

In sintering, a sintering aid may be used, if necessary. As the sintering aid there may be used a material generally used for sintering silicon nitride. For example, one or more selected from elements of Al, Y, Mg, Be, Cr, Zr, B, C and lanthanide, and oxides, nitrides, carbides, borides, silicides, hydrides and silicates of these elements are preferred As the lanthanide elements are preferred La, Sm, Gd, Dy, Ho, Er, Tm, Yb and Lu.

Particularly, $ZrO_2$, $ZrO_2+Yb_2O_3$, $ZrO_2+La_2O_3$, $ZrO_2+Nd_2O_3$, BeO, $CrO_2+La_2O_3$, $CrO_2+Yb_2O_3$, $Ho_2O_3$, $Er_2O_3$, $Tm_2O_3$ and are most suitable.

The composite sintered bodies obtained by using these sintering aids can be heat treated at a temperature below the sintering temperature of materials free of these aids and improved in high-temperature properties by crystallizing the phase containing the aids added therein.

The particles added are dispersed in the ceramic matrix. When cracks propagate through the matrix, the ends of the cracks impinge on the dispersed particles, thereby preventing the propagation of the cracks and allowing the turning or branching of the cracks to occur, so that the energy at the ends of the cracks is scattered and absorbed. On the other hand, whiskers do not only prevent the propagation of the cracks or turning of the cracks in the same manner as in the case of the particles when the ends of the cracks impinge on the whiskers, but also after the ends work through the whiskers bridge between fractured surfaces and thereafter the whiskers are pulled out to absorb the energy of the propagation of cracks, thereby improving the toughness of the composite ceramics.

If the particles alone are incorporated into composite ceramics, however, the toughness is not so improved, because the bridging and pull-out effects of the whiskers cannot be expected. If the whiskers alone are incorporated into composite ceramics, on the other hand, the above-mentioned effects should be expected, but since the whiskers have in fact a small diameter, the propagation of cracks is hardly prevented when the ends of cracks impinge on the whiskers, and the bridging and pull-out effects of the whiskers are not sufficiently brought about when the cracks are rapidly propagated. Occasionally, some of the whiskers are broken and cracks go on straight.

The incorporation of both the particles and the whiskers in composite ceramics according to this invention overcomes the above-mentioned problems. Both the effects can be drawn out. That is to say, the particles are a bar against the rapid propagation of cracks, which tentatively prevents or retards the propagation. Thus, the whiskers near the cracks retarded in propagation can sufficiently exhibit the bridging and pull-out effects, so that the energy of cracks is effectively absorbed. Therefore, the composite ceramic sintered body has a conspicuously improved toughness.

This invention will be explained with reference to some examples and comparative examples below.

EXAMPLE 1

Commercially available silicon carbide whiskers (diameter: about 0.5 to 1.0 $\mu$m) were dispersed in a solvent with a ultrasonic wave. The dispersion was treated to remove impurities and undispersed lumps of whiskers therefrom.

20 wt % of the whiskers in the treated dispersion and 20 wt % of silicon carbide particles having various average particle sizes within the range of 5 to 80 $\mu$m were mixed with 60 wt % of silicon nitride particles (average particle size: 0.5 $\mu$m). To the mixture was added 6 wt % of $Y_2O_3$ and 3 wt % of $Al_2O_3$ based on the weight of the mixture. The resultant mixture was sintered in a hot press in a nitrogen atmosphere at 1800° C. for 1 hour. The fractural toughness and four point-bending strength of the resultant sintered bodies are shown in FIG. 1.

Figure 1:
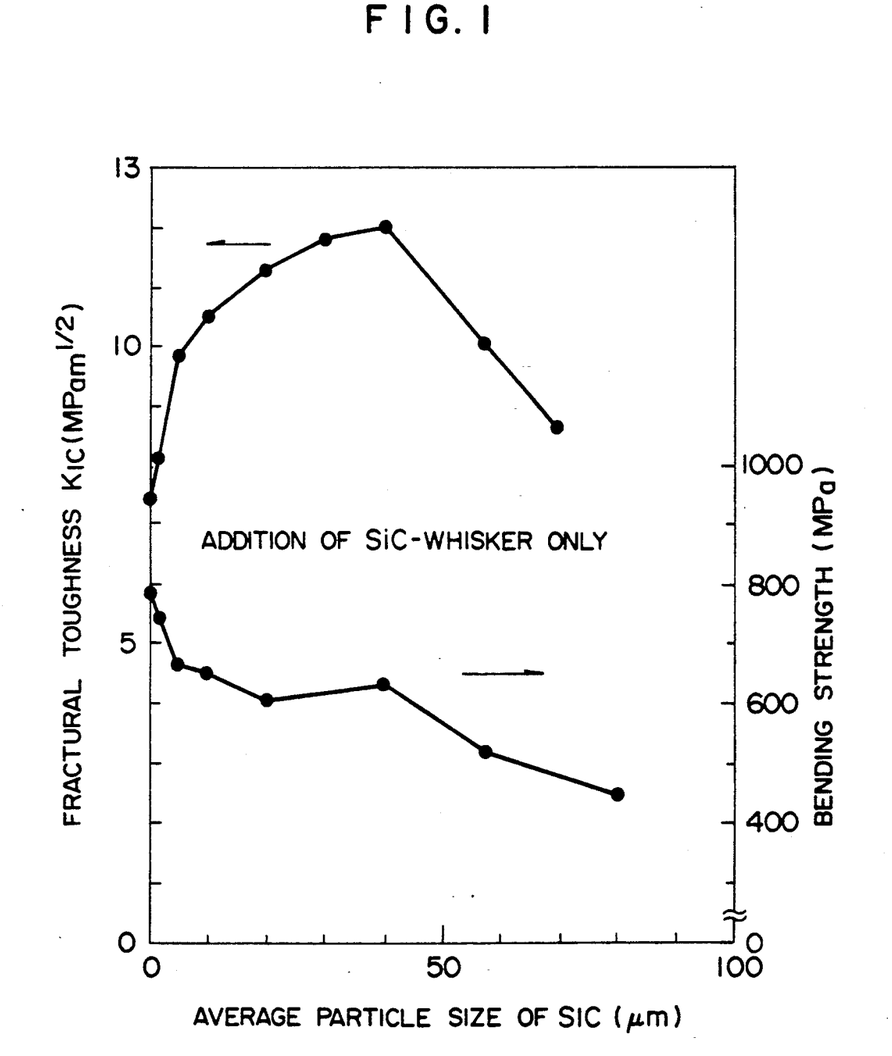
FIG. 1 is a graph showing a relationship of the bending strength and fractural toughness of the sintered body obtained in EXAMPLE 1, to the particle size of SiC particles.

According to FIG. 1, it is found that the fractural toughness is greatly improved with the sintered bodies containing the silicon carbide particles of 5 to 60 μm in average particle size incorporated therein. It is particularly noted that the sintered bodies containing silicon carbide particles of 10 to 60 μm in average particle size incorporated therein have a very high fractural toughness ($K_{IC}$) of 10 to 12 MPam$^{\frac{1}{2}}$, which could not be achieved with conventional sintered bodies of this kind.

The fractured surfaces of the sintered body containing silicon carbide particles of 40 μm in average particle size were observed by SEM. In the SEM photographs, it is observed that cracks turned around the silicon carbide particles and a crack was divided in two directions. Furthermore, many pull-out sites of silicon carbide whiskers are found. Thus, it was confirmed that such conditions are a factor for the improvement in toughness of the sintered bodies.

Furthermore, the high-temperature strength and toughness of the sintered bodies were not almost reduced in a nitrogen atmosphere at a temperature of up to 1300° C.

EXAMPLE 2

Figure 2:
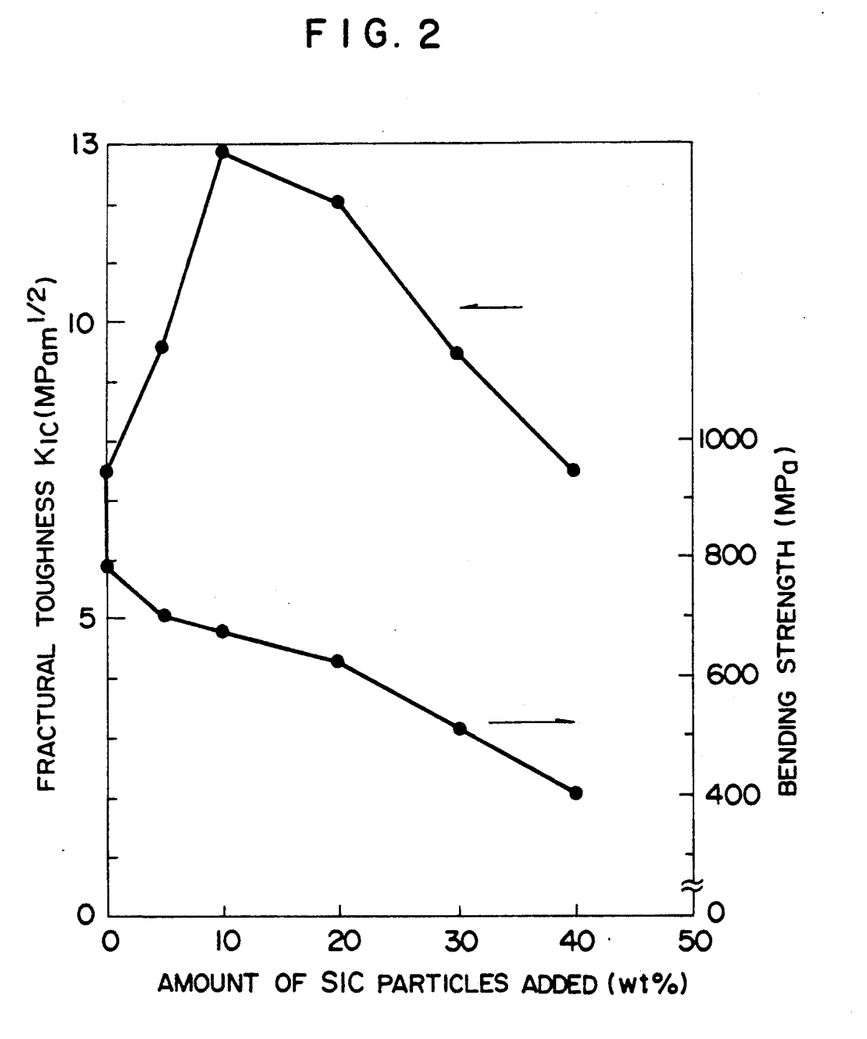
FIG. 2 is a graph showing a relationship of the bending strength and fractural toughness of the sintered body obtained in EXAMPLE 2, to the amount of SiC particles added.

The same procedures as in EXAMPLE 1 were repeated to obtain composite sintered bodies, except that the amounts of the silicon carbide whiskers and the silicon carbide particles added were 20 wt % and 0 to 40 wt %, respectively, and the average particle size of said particles was 40 μm. The fractural toughness and four-point bending strength at room temperature of these composite sintered bodies are shown in FIG. 2.

The sintered body containing 10 wt % of silicon carbide added thereto exhibited a very high toughness ($K_{IC}$) of 13 MPam$^{\frac{1}{2}}$.

EXAMPLE 3

20 wt % of the same silicon carbide whiskers as used in Example 1, 10 wt % of silicon carbide particles having an average particle size of 40 μm, sintering aids of 4 wt % $ZrO_2$ and 6.5 wt % $Yb_2O_3$, and 59.5 wt % of a silicon nitride powder were intimately mixed. The mixture was hot press sintered in a nitrogen atmosphere at 1850° C. for 1 hour.

Figure 3:
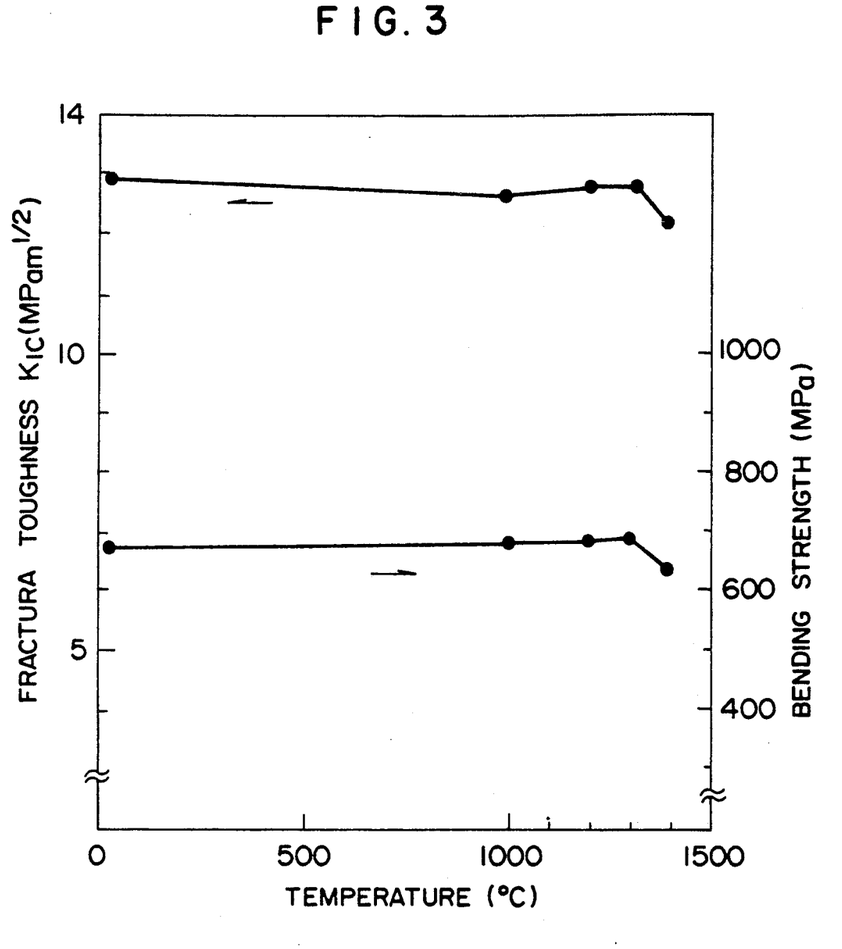
FIG. 3 is a graph showing the bending strength and fractural toughness at high temperatures of the sintered body obtained in EXAMPLE 3.

The bending strength and toughness at high temperatures of the composite sintered bodies are shown in FIG. 3. From FIG. 3 it is found that the strength and toughness are not reduced until the sintered bodies reach 1400° C. Thus, the sintered bodies are very excellent in heat resistance.

EXAMPLE 4

20 wt % of silicon carbide whiskers and 10 wt % of silicon carbide particles having an average particle size of 20 μm or 40 μm were intimately mixed together with a silicon nitride powder and sintering aids. The mixture was shaped and pressureless sintered in a nitrogen atmosphere. The relative densities of the resultant sintered bodies were 95% in both the cases. The bending strength was 500 MPa for the sintered body containing the silicon carbide particles of 20 μm in average particle size, and 530 MPa for the sintered bodies containing the silicon carbide particles of 40 μm in average particle size. The fractural toughness was 10.8 MPam$^{\frac{1}{2}}$ for the former and 11.3 MPam$^{\frac{1}{2}}$ for the latter.

As a result, it was found that sintered bodies having a high strength and high toughness could be obtained even by pressureless sintering.

EXAMPLE 5

The sintered bodies obtained in EXAMPLE 4 were HIP treated at a temperature of 1800° to 2000° C. in a nitrogen gas medium to densify these sintered bodies to a relative density of 99% or higher. The bending strength and fractural toughness were 610 MPa and 12 MPam$^{\frac{1}{2}}$, respectively, for the densified bodies containing the silicon carbide particles of 20 μm in average particle size, and 630 MPa and 12.5 MPam$^{\frac{1}{2}}$, respectively, for the densified bodies containing the silicon carbide particles of 40 μm in average particle size.

EXAMPLE 6

Figure 4:
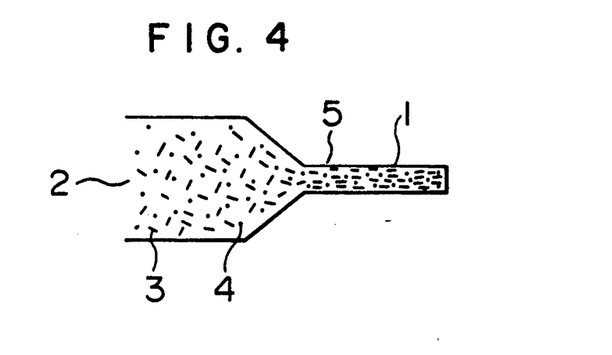
FIG. 4 is a schematic cross-sectional view of the arrangement of whiskers in an extrusion molding.

To the mixture powder used in EXAMPLE 4 was further added 10 wt % of low-density polyethylene as a thermoplastic resin. The mixture was closely kneaded and extruded to form a rod-like shape. The resultant shape had whiskers oriented therein in a direction, as shown in FIG. 4. The shape was degreased in a usual way at a rate of 3° C./hr for 500 hours and pressureless sintered in a nitrogen atmosphere.

Some of the resultant pressureless sintered bodies were HIP treated. In this example, since the whiskers were oriented in a direction, the toughness was higher in a direction perpendicular to the whisker-oriented direction.

Measurement of bending strength and fractural toughness were made so that cracks were propagated in a direction perpendicular to the whisker-oriented direction.

The pressureless sintered bodies containing 20 wt % of silicon carbide whiskers and 10 wt % of silicon carbide particles of 40 μm in average particle size added thereto had a bending strength of 530 MPa and fractural toughness of 11.5 MPam$^{\frac{1}{2}}$, and they had a bending strength of 690 MPa and fractural toughness of 13.7 MPam$^{\frac{1}{2}}$ when HIP treated.

EXAMPLE 7

Figure 5:
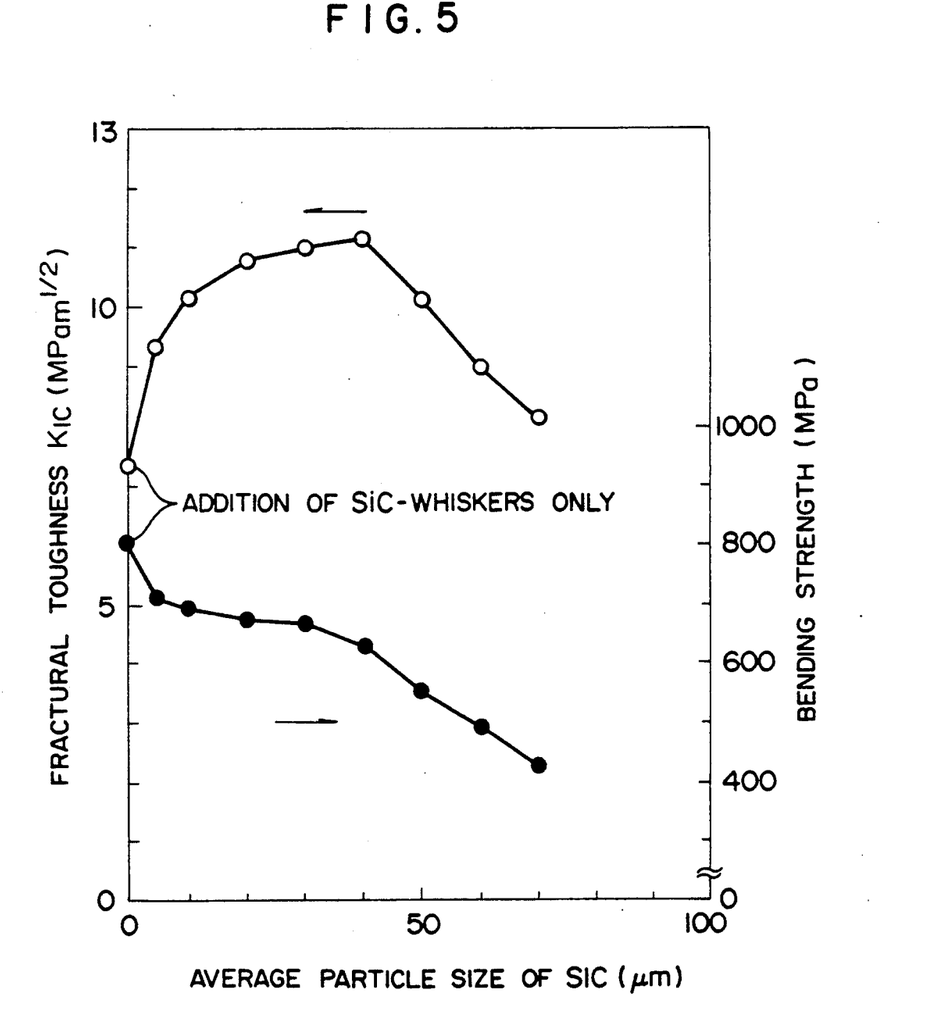
FIG. 5 is a graph showing the bending strength and fractural toughness at room temperature of the sintered body obtained in EXAMPLE 7, to the particle size of SiC particles.

20 wt % of the same whiskers as used in EXAMPLE 1 and 20 wt % of silicon carbide particles of 1 to 80 μm in average particle size were mixed with a SiAlON powder and then pressureless sintered at 1850° C. in a nitrogen atmosphere. The fractural toughness and four-point bending strength at room temperature of the resultant sintered bodies are shown in FIG. 5.

With the sintered bodies containing silicon carbide particles of 5 to 60 μm in average particle size, the fractural toughness was greatly improved. Particularly with the sintered bodies containing silicon carbide particles of 10 to 60 μm, the fractural toughness ($K_{IC}$) was 10 to 11 MPam$^{\frac{1}{2}}$. So high fractural toughness could not be obtained with conventional materials and by pressureless sintering.

The fractured surfaces of sintered bodies containing silicon carbide particles of 40 μm in average particle size were observed by SEM. It was found that cracks turned around the silicon carbide particles and branched away in two directions. Furthermore, many pull-outs of whiskers were seen. It was confirmed that the turning, branching and pull-out were main causes for improving the fractural toughness.

The weight gain of the resultant sintered bodies was not almost seen when oxidized at 1100° C. for 1000 hours. On the other hand, 30 wt % of TiC whiskers and 30 wt % of TiSi$_2$ were incorporated into SiAlON, which was sintered in the same manner as in this example. The resultant sintered bodies were oxidized at 1100° C. for 1000 hours for examining the weight gain. The results are shown in FIG. 6.

Figure 6:
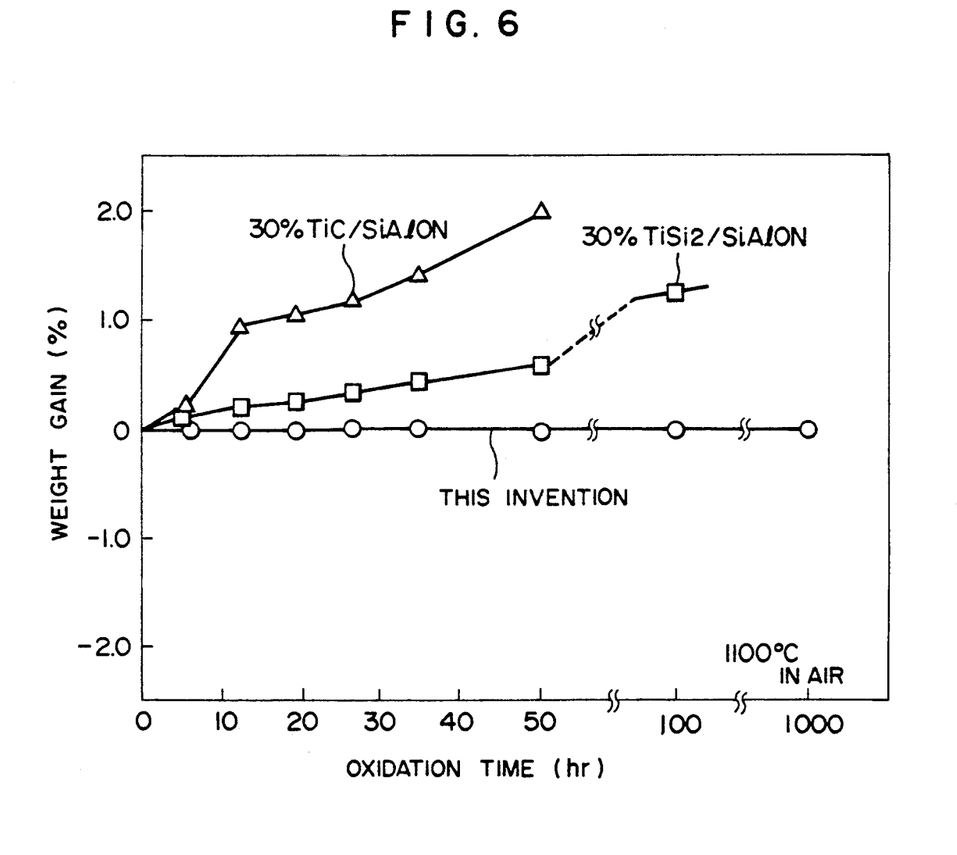
FIG. 6 is a graph showing a rate of change in weight of various sintered bodies, to a period of oxidation.

From FIG. 6 it is clear that the sintered bodies according to this invention are excellent in oxidation resistance.

EXAMPLE 8

Figure 7:
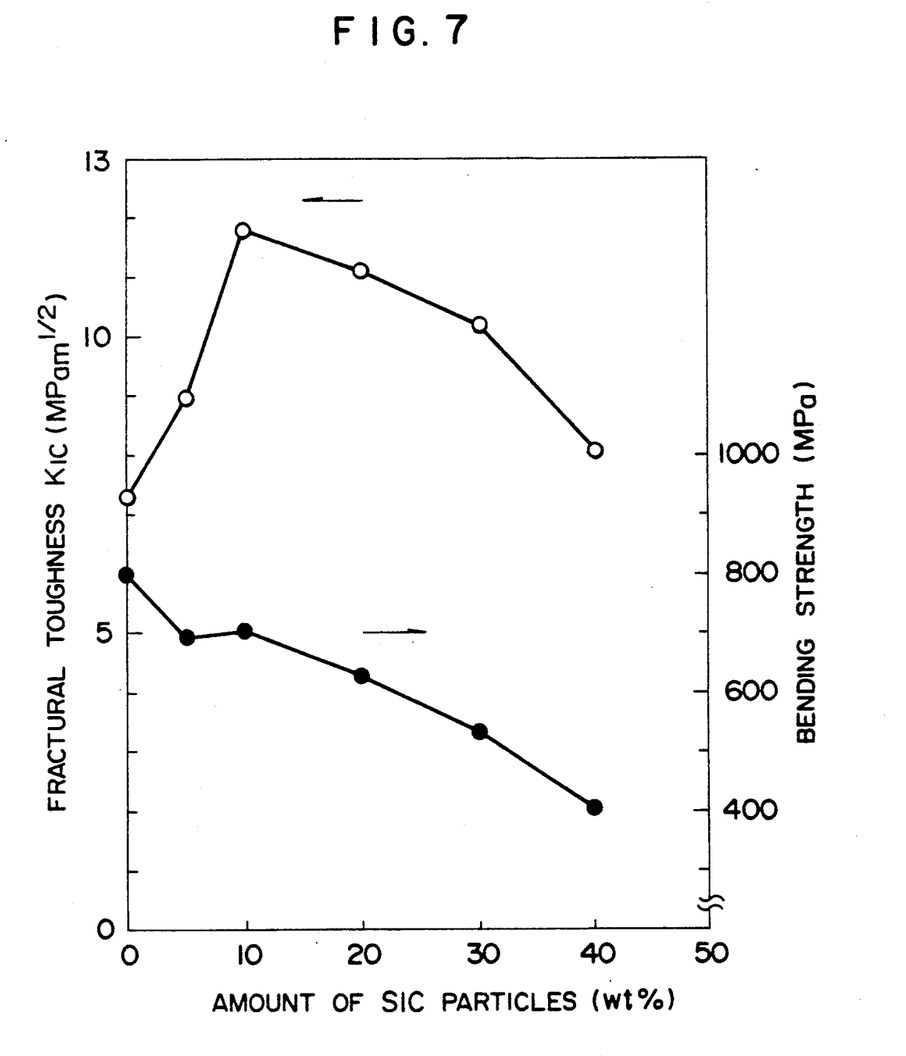
FIG. 7 is a graph showing a relationship of the bending strength and fractural toughness at room temperature of the sintered body obtained in EXAMPLE 8, to the amount of SiC particles added.

The same procedures as in EXAMPLE 7 were repeated to produce composite sintered bodies, except that 20 wt % of silicon carbide whiskers and 0 to 40 wt % of silicon carbide particles of 40 μm in average particle size were incorporated. The fractural toughness and four-point bending strength at room temperature of the resultant sintered bodies are shown in FIG. 7.

The sintered bodies containing 10 wt % of silicon carbide particles had a very high toughness ($K_{IC}$) of 11.8 MPam$^{\frac{1}{2}}$.

Figure 8:
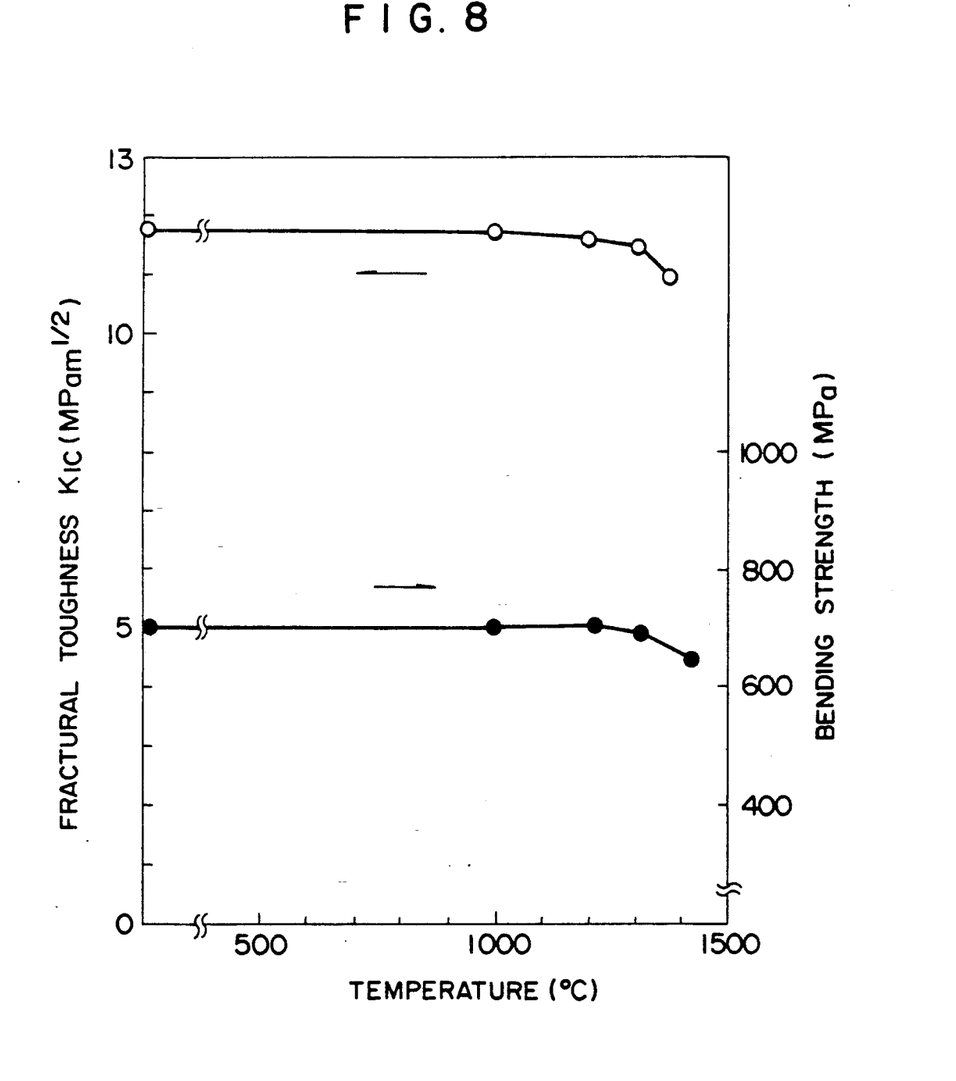
FIG. 8 is a graph showing a change of the bending strength and fractural toughness at high temperatures of the sintered body obtained in EXAMPLE 7.

The strength and toughness at high temperatures of the composite sintered bodies containing 20 wt % of silicon carbide whiskers and 10 wt % of silicon carbide particles of 40 μm in average particle size are shown in FIG. 8. From FIG. 8 it is clear that the strength and toughness were not reduced at a temperature below 1300° C. and thus the sintered bodies were very excellent in heat resistance.

EXAMPLE 9

20 wt % of silicon carbide whiskers and 10 wt % of silicon carbide particles of 20 μm or 40 μm in average particle size were intimately mixed with a SiAlON powder, shaped and hot press sintered in a nitrogen atmosphere. The relative densities of the resultant sintered bodies were about 99% or more in both the cases. The bending strength was 780 MPa for the sintered bodies containing the silicon carbide particles of 20 μm and 760 MPa for the sintered bodies containing the silicon carbide particles of 40 μm. The fractural toughness each was 11.8 MPam$^{\frac{1}{2}}$ and 12.3 MPam$^{\frac{1}{2}}$.

EXAMPLE 10

20 wt % of silicon carbide whiskers and 40 wt % of silicon carbide particles of 20 μm and 40 μm in average particle size were intimately mixed with a SiAlON powder, shaped, pressureless sintered and HIP treated in a nitrogen gas atmosphere at a temperature of 1800° to 2000° C. The HIP treated sintered bodies were densified to 99% or more. The bending strength and fractural toughness were 790 MPa and 12 MPam$^{\frac{1}{2}}$, respectively, for the sintered bodies containing the silicon carbide particles of 20 μm, and 770 MPa and 12.8 MPam$^{\frac{1}{2}}$, respectively, for the sintered bodies containing the silicon carbide particles of 40 μm in average particle size.

EXAMPLE 11

To the mixture powder of EXAMPLE 10 was further added a thermoplastic resin. The mixture was intimately kneaded and extruded in a rod-like shape, in which the whiskers were allowed by the extrusion to orient in a direction, as shown in FIG. 4. The thus formed shapes were degreased in a usual way and then pressureless sintered in a nitrogen gas atmosphere.

Furthermore, some of the pressureless sintered bodies were HIP treated.

The sintered bodies of this example had particularly improved toughness in a direction perpendicular to the whisker-oriented direction.

The four-point bending strength and fractural toughness of these bodies were determined by testing so that cracks are allowed to propagate in a direction perpendicular to the whisker-oriented direction.

The pressureless sintered bodies containing 20 wt % of the silicon carbide whiskers and 10 wt % of the silicon carbide particles of 40 μm in average particle size exhibited a bending strength of 750 MPa and a fractural toughness of 12.6 MPam$^{\frac{1}{2}}$, and the HIP treated bodies exhibited a bending strength of 810 MPa and a fractural toughness of 13.8 MPam$^{\frac{1}{2}}$.

EXAMPLE 12

Commercially available silicon carbide whiskers (average particle size: about 0.5 to 1.0 μm) were dispersed in water by ultrasonic wave, so that the lumps of the whiskers were broken. Then, remaining lumps and particulate impurities were removed. 1 to 50 wt % of the thus treated whiskers and 1 to 30 wt % of the silicon carbide particles of 1 to 80 μm in average particle size were mixed with each of alumina, mullite and zirconia powders, which were hot press sintered or pressureless sintered. The properties of the thus obtained sintered bodies are shown in Table 1.

The fractured surfaces of the sintered bodies containing 10 wt % of the silicon carbide particles of 40 μm in average particle size and 20 wt % of the silicon carbide whiskers added thereto were observed by SEM. In the SEM photographs it is seen that cracks turn around the silicon carbide particles or branched away in two directions. Furthermore, many pull-outs of whiskers were seen. It was thus confirmed that the turning, branching and pull-out were main causes for improving the fractural toughness.

EXAMPLE 13

20 wt % of silicon nitride or silicon carbide whiskers and 10 to 20 wt % of silicon nitride or silicon carbide particles of 20 or 40 μm were intimately mixed with 70 wt % of each of alumina, mullite and zirconia powders, and then adequately sintered.

The properties of the resultant sintered bodies are shown in Table 2.

EXAMPLE 14

40 wt % of silicon carbide whiskers and 30 wt % of silicon nitride particles of 20 μm in average particle size were intimately mixed with 30 wt % of each of lithium-aluminosilicate glass (LAS) and magnesium-aluminate-silicate glass (MAS). The mixture was heated to allow glass to melt away and to form densified composite sintered bodies. The fractural toughness ($K_{IC}$) of the sintered bodies was 13.3 MPam$^{\frac{1}{2}}$ for the LAS glass and 12.8 MPam$^{\frac{1}{2}}$ for the MAS glass.

EXAMPLE 15

The same procedures as in EXAMPLE 14 were repeated to form composite sintered bodies, except that 40 wt % of alumina whiskers and 30 wt % of alumina particles of 20 μm in average particle size were used. The resultant sintered bodies exhibited a fractural toughness of 12.0 MPam$^{\frac{1}{2}}$ for the LAS matrix and 11.3 MPam$^{\frac{1}{2}}$ for the MAS matrix.

EXAMPLE 16

20 wt % of silicon carbide whiskers and 10 wt % of silicon carbide particles of 20 μm or 40 μm in average particle size were intimately mixed with an alumina powder shaped and pressureless sintered. The resultant sintered bodies were HIP treated in an argon gas atmosphere at a temperature of 1800° to 2000° C. The HIP treated sintered bodies exhibited a bending strength and fractural toughness of 910 MPa and 11.2 MPam$^{\frac{1}{2}}$, respectively, for the sintered bodies containing the silicon carbide particles of 20 μm and of 980 MPa and 12.8 MPam$^{\frac{1}{2}}$, respectively, for the sintered bodies containing the silicon carbide particles of 40 μm.

EXAMPLE 17

20 wt % of silicon carbide whiskers and 10 wt % of silicon carbide particles of 20 μm in average particle size were intimately mixed with 70 wt % of an alumina powder and hot press sintered The resultant sintered bodies were applied to cutting tools.

FC-25 was milled (dry) with the cutting tools. The cutting rate was 2 or 3 times higher than that of the conventional tools using a white ceramics at a travelling speed of 0.2 to 0.3 mm/tooth.

EXAMPLE 18

To the mixture powder of EXAMPLE 17 was added 15% of low-density polyethylene as a thermoplastic resin. The admixture was intimately kneaded and extruded in a rod-like shapes, in which the whiskers were oriented in an extrusion direction. The resultant shapes heated at a rate of 3° C./hr to 500° C., degreased and then pressureless sintered at 1800° C.

Some of the pressureless sintered bodies were HIP treated at 2000 atm and 1900° C. for 1 hour.

Since the whiskers were oriented in the same direction, the sintered bodies were greatly improved in the toughness in a direction perpendicular to the whisker-oriented direction.

The four-point bending strength and fractural toughness were determined in such a manner that cracks were allowed to propagate in a direction perpendicular to the whisker-oriented direction.

The bending strength and fractural toughness were 870 MPa and 9.7 MPam$^{\frac{1}{2}}$, respectively, for the pressureless sintered bodies and 980 MPa and 13.1 MPam$^{\frac{1}{2}}$, respectively, for the HIP treated sintered bodies.

As is clear from the foregoing, according to this invention, there can be obtained various sintered bodies having a fractural toughness of 10 MPam$^{\frac{1}{2}}$, or more and a bending strength of 500 MPa or more. The sintered bodies of this invention have an excellent homogeniety, isotropicity, heat resistance, impact resistance, erosin resistance and oxidation resistance, and therefore, they are applicable to high-temperature structural elements, blades of gas turbines, hot plugs of diesel engines, housings of internal combustion engines, hot forging dies, rotators of turbochargers; and cutting tools, various nozzles and pipes. Furthermore, they are greatly reliable in industries.

TABLE 1

| No. | Matrix | wt % SiC-Whiskers | Additives SiC Particles Size (μm) | Additives SiC Particles Amount (wt %) | Ratio Whiskers/Particles | Sintering Method | Bending Strength (MPa) | Fractural Toughness $K_{IC}$ (MPam$^{\frac{1}{2}}$) |
|---|---|---|---|---|---|---|---|---|
| 1 | alumina | 5 | 20 | 30 | 0.17 | pressureless | 710 | 4.2 |
| 2 | alumina | 5 | 40 | 20 | 0.25 | pressureless | 730 | 4.5 |
| 3 | alumina | 10 | 30 | 20 | 0.5 | pressureless | 840 | 6.2 |
| 4 | alumina | 10 | 40 | 20 | 0.2 | pressureless | 830 | 6.4 |
| 5 | alumina | 20 | 5 | 10 | 2 | pressureless | 810 | 7.0 |
| 6 | alumina | 20 | 10 | 5 | 4 | pressureless | 800 | 7.3 |
| 7 | alumina | 20 | 10 | 10 | 2 | pressureless | 790 | 7.6 |
| 8 | alumina | 20 | 20 | 10 | 2 | pressureless | 770 | 9.1 |
| 9 | alumina | 20 | 20 | 20 | 1 | pressureless | 680 | 8.3 |
| 10 | alumina | 20 | 30 | 10 | 2 | pressureless | 810 | 9.7 |
| 11 | alumina | 20 | 40 | 10 | 2 | pressureless | 800 | 10.2 |
| 12 | alumina | 20 | 40 | 10 | 2 | hot press | 970 | 11.3 |
| 13 | alumina | 20 | 40 | 20 | 1 | pressureless | 760 | 9.5 |
| 14 | alumina | 20 | 40 | 20 | 1 | hot press | 920 | 10.4 |
| 15 | alumina | 20 | 50 | 10 | 2 | pressureless | 770 | 8.0 |
| 16 | alumina | 20 | 60 | 10 | 2 | pressureless | 650 | 6.8 |
| 17 | alumina | 20 | 80 | 10 | 2 | pressureless | 420 | 4.7 |
| 18 | alumina | 30 | 1 | 20 | 1.5 | pressureless | 480 | 5.0 |
| 19 | alumina | 30 | 5 | 30 | 1 | hot press | 630 | 6.7 |
| 20 | alumina | 30 | 20 | 10 | 3 | pressureless | 500 | 7.3 |
| 21 | alumina | 40 | 10 | 10 | 4 | pressureless | 460 | 7.2 |
| 22 | alumina | 40 | 30 | 5 | 8 | hot press | 410 | 6.5 |
| 23 | alumina | 50 | 5 | 10 | 5 | hot press | 520 | 7.0 |
| 24 | alumina | 50 | 20 | 10 | 5 | hot press | 510 | 7.7 |
| 25 | mullite | 10 | 40 | 20 | 0.5 | pressureless | 790 | 6.2 |
| 26 | mullite | 20 | 30 | 20 | 1 | pressureless | 780 | 8.9 |
| 27 | mullite | 20 | 30 | 20 | 1 | hot press | 900 | 10.1 |
| 28 | mullite | 20 | 40 | 10 | 2 | hot press | 980 | 11.2 |
| 29 | mullite | 20 | 40 | 20 | 1 | hot press | 940 | 10.8 |
| 30 | mullite | 30 | 20 | 10 | 3 | hot press | 710 | 7.7 |
| 31 | zirconia | 5 | 20 | 5 | 1 | hot press | 870 | 7.5 |
| 32 | zirconia | 10 | 20 | 10 | 1 | hot press | 830 | 8.8 |
| 33 | zirconia | 20 | 30 | 10 | 2 | pressureless | 700 | 10.6 |
| 34 | zirconia | 20 | 40 | 10 | 2 | pressureless | 770 | 11.4 |
| 35 | zirconia | 20 | 40 | 10 | 2 | hot press | 970 | 12.2 |
| 36 | zirconia | 20 | 40 | 20 | 1 | hot press | 910 | 11.7 |
| 37 | zirconia | 30 | 40 | 10 | 3 | hot press | 980 | 12.8 |

TABLE 1-continued

| | | Additives | | | | | Fractural |
| | | wt % SiC-Whiskers | SiC Particles | | Ratio Whiskers/ Particles | Sintering Method | Bending Strength (MPa) | Toughness $K_{IC}$ (MPam$^{\frac{1}{2}}$) |
| No. | Matrix | | Size (μm) | Amount (wt %) | | | | |
| --- | --- | --- | --- | --- | --- | --- | --- | --- |
| 38 | zirconia | 30 | 20 | 10 | 3 | hot press | 890 | 10.9 |

TABLE 2

| | | Additives | | | | | | Bending | Fractural Toughness |
| | | Whiskers | | Particles | | | Ratio | Strength | $K_{IC}$ |
| No. | Matrix | Kinds | Amount (wt %) | Kinds | Size (μm) | Amount (wt %) | Whiskers/ Particles | Sintering Method | (MPa) | (MPam$^{\frac{1}{2}}$) |
| --- | --- | --- | --- | --- | --- | --- | --- | --- | --- | --- |
| 39 | alumina | Si$_3$N$_4$ | 20 | SiC | 40 | 10 | 2 | hot press | 930 | 10.8 |
| 40 | alumina | Si$_3$N$_4$ | 20 | Si$_3$N$_4$ | 1 | 20 | 1 | pressureless | 790 | 6.3 |
| 41 | alumina | Si$_3$N$_4$ | 20 | Si$_3$N$_4$ | 5 | 10 | 2 | pressureless | 730 | 6.8 |
| 42 | alumina | Si$_3$N$_4$ | 20 | Si$_3$N$_4$ | 5 | 20 | 1 | pressureless | 710 | 7.1 |
| 43 | alumina | SiC | 20 | Si$_3$N$_4$ | 5 | 20 | 1 | pressureless | 780 | 7.9 |
| 44 | mullite | Si$_3$N$_4$ | 20 | Si$_3$N$_4$ | 5 | 20 | 1 | hot press | 870 | 8.6 |
| 45 | mullite | Si$_3$N$_4$ | 20 | Si$_3$N$_4$ | 5 | 30 | 0.7 | hot press | 840 | 8.3 |
| 46 | mullite | Si$_3$N$_4$ | 20 | SiC | 40 | 10 | 2 | hot press | 960 | 10.5 |
| 47 | mullite | SiC | 20 | Si$_3$N$_4$ | 5 | 10 | 2 | pressureless | 790 | 6.5 |
| 48 | mullite | SiC | 20 | Si$_3$N$_4$ | 5 | 20 | 1 | pressureless | 750 | 7.1 |
| 49 | zirconia | Si$_3$N$_4$ | 20 | Si$_3$N$_4$ | 5 | 20 | 1 | pressureless | 850 | 7.8 |
| 50 | zirconia | Si$_3$N$_4$ | 20 | SiC | 40 | 10 | 2 | hot press | 800 | 8.5 |
| 51 | zirconia | Si$_3$N$_4$ | 20 | SiC | 30 | 20 | 1 | hot press | 770 | 8.0 |
| 52 | zirconia | SiC | 20 | Si$_3$N$_4$ | 5 | 20 | 1 | hot press | 920 | 9.1 |
| 53 | zirconia | SiC | 20 | Si$_3$N$_4$ | 1 | 30 | 0.7 | pressureless | 840 | 8.1 |

What is claimed is:

1. A composite ceramic sintered body which comprises a ceramic matrix comprised mainly of a ceramic matrix of silicon nitride, silicon oxynitride or an inorganic oxide, said matrix having an average particle size of less than 10 μm, said matrix containing whiskers and particles of a ceramic material having a higher melting point than the sintering temperature of said matrix uniformly dispersed therein, said whiskers having diameters in the range of 0.1 to 5 μm and being in an amount of 1 to 50 % and said particles having an average particle size of 10 to 50 μm, which size is greater than the average particle size of the matrix particles and being in an amount of 1 to 30 wt %, said amounts being based on said composite ceramic body.

2. The composite ceramic sintered body according to claim 1, wherein said inorganic oxide is at least one member selected from the group consisting of alumina, mullite, zirconia, high silica glass, lithium-aluminosilicate glass, magnesium-aluminosilicate glass and barium-magnesium-aluminosilicate glass.

3. The composite ceramic sintered body according to claim 1, wherein said ceramic material is selected from the group consisting of silicon carbide (SiC), silicon nitride (Si$_3$N$_4$), silicon oxynitride, alumina and zirconia.

4. The composite ceramic sintered body according to claim 1, wherein said silicon oxynitride is SiAlON.

5. The composite ceramic sintered body according to claim 1, wherein the diameter of the whisker is in the range of 0.5 to 1.0 μm.

6. The composite ceramic sintered body according to claim 1, wherein the amount of the whiskers is in the range of 1 to 40 wt %.

7. The composite ceramic sintered body according to claim 1, wherein the whisker/particle weight ratio is in the range of 0.5 to 20.

8. The composite ceramic sintered body according to claim 1, further comprising at least one sintering aid selected from the group consisting of aluminum(Al), yttrium(Y), magnesium(Mg), beryllium(Be), chromium(Cr), zirconium(Zr), boron(B), carbon(C) and lanthanide elements, and oxides, nitrides, carbides, borides, silicides, hydrides and silicates thereof.

9. The composite ceramic body according to claim 1, wherein the whiskers/particle weight ratio is in the range of 1 to 5.

10. The composite ceramic sintered body according to claim 8, wherein said sintering aid is ZrO$_2$ to ZrO$_2$ and Yb$_2$O$_3$.

11. The composite ceramic sintered body according to claim 8, wherein the sintering aid is contained in an amount of 1 to 15 wt % based on said sintered body.

12. A composite ceramic sintered body which comprises a ceramic matrix made of silicon nitride having an average particle size of 10 μm; whiskers made of less than a material having a higher melting point than the sintering temperature of silicon nitride and having a diameter of 0.1 μm or more than the amount of whiskers being 1 to 50 wt % based on said composite ceramic body; and particles made of a material having a higher melting point than the sintering temperature of silicon nitride and having an average particle size of 10 to 50 μm, the amount of particles being 1 to 30 wt % based on said composite ceramic body; wherein the average particle size of the particles is larger than the average particle size of the matrix, and the whiskers and the particles are uniformly dispersed in the matrix.

13. A composite ceramic sintered body which comprises a ceramic matrix made of silicon nitride; whiskers of silicon carbide dispersed in the matrix; and particles of silicon carbide dispersed in the matrix, the average particle size of the sintered ceramic matrix being less than 10 μm; the diameter of the whiskers being 0.1 μm or more; and the amount of the whiskers being 1 to 50 wt % based on the sintered body; the average particle size of the particles being 10 to 50 μm; and the amount of the particles being 1 to 30 wt % based on the sintered body, wherein the average particle size of the particles is larger than the average particle size of the matrix.

* * * * *